United States Patent
Salzer et al.

[11] Patent Number: 5,944,329
[45] Date of Patent: Aug. 31, 1999

[54] REVERSIBLE MICROMACHINING LOCATOR

[75] Inventors: Leander J. Salzer; Larry R. Foreman, both of Los Alamos, N.Mex.

[73] Assignee: The Regents of the University of California, Los Alamos, N.Mex.

[21] Appl. No.: 08/925,096

[22] Filed: Sep. 8, 1997

Related U.S. Application Data

[60] Provisional application No. 60/025,849, Sep. 6, 1996.

[51] Int. Cl.⁶ ....................................................... B23B 5/22
[52] U.S. Cl. ........................... 279/128; 279/145; 279/133
[58] Field of Search ................................ 279/3, 128, 133, 279/143, 145; 269/8

[56] References Cited

U.S. PATENT DOCUMENTS

| | | | |
|---|---|---|---|
| 4,449,027 | 5/1984 | Fujikawa | 279/1 R |
| 5,080,380 | 1/1992 | Nakagawa | 269/8 |
| 5,467,249 | 11/1995 | Barnes et al. | 279/128 |
| 5,738,165 | 4/1998 | Imai | 279/3 |
| 5,841,624 | 11/1998 | Xu et al. | 279/128 |

*Primary Examiner*—Andrea L. Pitts
*Assistant Examiner*—Rouzbeh Tabaddor
*Attorney, Agent, or Firm*—Gemma Morrison Bennett

[57] ABSTRACT

This invention provides a device which includes a locator, a kinematic mount positioned on a conventional tooling machine, a part carrier disposed on the locator and a retainer ring. The locator has disposed therein a plurality of steel balls, placed in an equidistant position circumferentially around the locator. The kinematic mount includes a plurality of magnets which are in registry with the steel balls on the locator. In operation, a blank part to be machined is placed between a surface of a locator and the retainer ring (fitting within the part carrier). When the locator (with a blank part to be machined) is coupled to the kinematic mount, the part is thus exposed for the desired machining process. Because the locator is removably attachable to the kinematic mount, it can easily be removed from the mount, reversed, and reinserted onto the mount for additional machining. Further, the locator can likewise be removed from the mount and placed onto another tooling machine having a properly aligned kinematic mount. Because of the unique design and use of magnetic forces of the present invention, positioning errors of less than 0.25 micrometer for each machining process can be achieved.

16 Claims, 7 Drawing Sheets

REVERSIBLE MICROMACHINING LOCATOR

This application claims priority to Provisional Application Serial No. 60/025,849 filed Sep. 6, 1996.

This invention was made with government support under Contract No. W-7405ENG-36 awarded by the U.S. Department of Energy. The government has certain rights in the invention.

FIELD OF THE INVENTION

This invention relates to the precision machining (or micromachining) of complex miniature parts or subparts. Specifically, this invention couples onto a magnetic mount on a tooling machine, such as a lathe, polisher or jig bore, preferably with a positioning error of less than 0.25 micrometer and can hold millimeter sized geometrically shaped parts. If multistep fabrication is desired, the present invention is adapted to travel in the locator from one tooling machine to another, or can be flipped and remounted on a single tool to allow machining of both sides of the part. The part to be machined does not have to be repositioned between separate machining operation. With this invention, machining accuracy is much greater than with conventional miniature part holders.

BACKGROUND OF THE INVENTION

The trend of miniaturization of parts is a recognized need in today's highly complex world. This trend brings with it the need for developing efficient ways to produce smaller components to higher tolerance and specification levels. Micromachining is one solution to achieving this need, yet in today's conventional machine shops, the means for securing miniature parts to commercially available machine tools are very limited or nonexistent. Although small collets, chucks, mandrels and face plates work well for turning diameters or threading thin rods in conventional tooling machines, when specifications require multiple machining operations with high tolerance levels on the order of millimeter-sized parts or geometrically diverse parts, even collets chucks, mandrels and face plates are inadequate.

Securing and positioning extremely small parts within a tooling machine (such as a lathe, polisher or jig bore) for precise machining is very difficult if not sometimes impossible to achieve. Some commercial lathe tooling machine manufacturers include Levin, Louis & Sons, Inc., Servo Products Company and Minitool, Inc. This difficulty is further compounded when the parts require submicrometer tolerances, when such parts are required to be geometrically diverse or when the same miniature part requires machining on several surfaces.

In conventional practice, miniature blank parts (i.e., the part does not have a pattern or design) are secured to the tooling machine with a collet (which is a split, cone-shaped sleeve) for the initial machining process, and then has to be glued (e.g., by epoxy) to a mandrel or substrate and accurately aligned with a microscope for any additional machining processes. This process is inefficient and time consuming. Even when a collet is used, the accuracy of the part's correct alignment is compromised. Further, use of a collet requires removal, reversal, coordinate repositioning and precise reattachment of the part blank to a tooling machine's spindle center line for multistep operations.

Additionally, when the part requires additional machining processes, realignment of the glued part is very difficult, depends on the operator's skill in reintroducing the part back on the tooling machine and is equally difficult when it comes to removing the part from the tooling machine. While traditionally, vacuum forces are used to retain larger parts within the tooling machine, such forces are too weak to retain miniature parts in the tooling machine when the tooling machine applies any molding or cutting force. As such, under conventional practice, the amount of glue applied, the determination of the position of the part relative to the tooling machine, and the necessary repositioning of the part for additional machining may cause tolerance inaccuracies and processing difficulties resulting in scrap parts.

Typically, the greatest source of errors with conventional part holders is in relocating a part for subsequent fabrication steps (e.g., additional machining on a part). During additional fabrication steps, the accuracy of the machining is highly dependant upon the operator's skill, experience and finesse, but even without special effort, an operator can only usually achieve about 25 micrometers of accuracy. The present invention, in contrast, improves the art by allowing the locator to be reattached to a kinetic mount on a tooling machine with a significantly greater positioning accuracy (preferably about 0.25 micrometer or less). Furthermore, the alignment of the part for subsequent operation does not require a skilled operator and could be accomplished robotically.

Accordingly, it is an object of the present invention to provide a device which enables precision machining of complex miniature parts which is adapted to work with conventional tooling machines.

It is a further object of the present invention to provide a device which is adapted to be secured to a tooling machine, and which enables an operator to achieve precision machining with an accuracy of less than about 0.25 micrometer error.

It is also an object of the present invention to provide a device which is adapted to securely attach to a tooling machine for a single machining process, and which can removed and inserted into another tooling machine (or the same tooling machine) to allow additional machining on other surfaces of the miniature part without relocating the part from the device between machining processes.

It is also an object of the present invention to provide a device which is capable of milling precise patterns, such as required for optics or semiconductor technology, on several surfaces of a miniature part precisely and without any need to handle any surface of the part, while relaying highly specific tolerances to the part.

It is also an object of the present invention to provide an efficient device adapted to precisely mill a part in a tooling machine, which eliminates the cost and time of tool realignment and machine setup when a subminiature part requires additional machining on other surfaces of the part.

It is further an object of the present invention to provide an apparatus which makes precision micromachining more efficient in time and cost, requires less skill-intensive tasks and reduces scrap parts.

A further object of the present invention is to provide an apparatus which can function to precisely hold two or more separate parts during assembly steps.

A final object of the present invention is to provide an apparatus which can hold a blank upon which multiple parts are fashioned where selective and precise access to the part to be worked upon is accomplished by the apparatus.

These objects, as well of others evident to one of ordinary skill in the art, are accomplished by the invention described more fully herein.

SUMMARY OF THE INVENTION

One embodiment of the present invention includes at least one locator disposed upon a kinematic mount positioned on a conventional tooling machine and a part carrier disposed on the locator. In operation, a blank part to be machined is placed in the part support means. The locator has disposed therein three steel balls placed in an equidistant position circumferentially around the locator. The kinematic mount includes a plurality of magnets which alternate with grooves about the circumference of the mount. The steel balls on the locator are in register with the grooves on the mount. When the locator (with the blank part) is coupled to the kinematic mount, the part is thus exposed for the desired machining process. Because the locator is removably attachable to the kinematic mount, it can easily be removed from the mount, reversed, and reinserted onto the mount for additional machining. Further, the locator can likewise be removed from the mount and placed onto another tooling machine having a properly aligned kinematic mount. A further embodiment utilizes multiple locators designed to allow simultaneous removable attachment of the locators, either individually or as a coupled unit. This embodiment is particularly useful for micromachining assembly processes or complex processes which involve both micromachining steps and assembly steps. Because of the unique design and use of magnetic forces of all embodiments of the present invention, positioning errors of less than 0.25 micrometer for each machining process can be achieved.

BRIEF DESCRIPTION OF THE DRAWINGS

FIG. 5A is a cross-sectional view of locator 22, cut along the A axis; FIG. 5B is a cross-sectional view of locator 22, cut across the B axis; FIG. 5C is a cross-sectional view of locator 23, cut across the C axis; and FIG. 5D is a cross-sectional view of locator 23, cut across the D axis.

FIG. 6A shows locator 22 present on the mount and FIG. 6B shows locator 23 present on the mount.

FIG. 7A is a section through the locators including the steel balls 14, while FIG. 7B is a section through the offset bosses 28.

DESCRIPTION OF THE PREFERRED EMBODIMENTS

Figure 1:
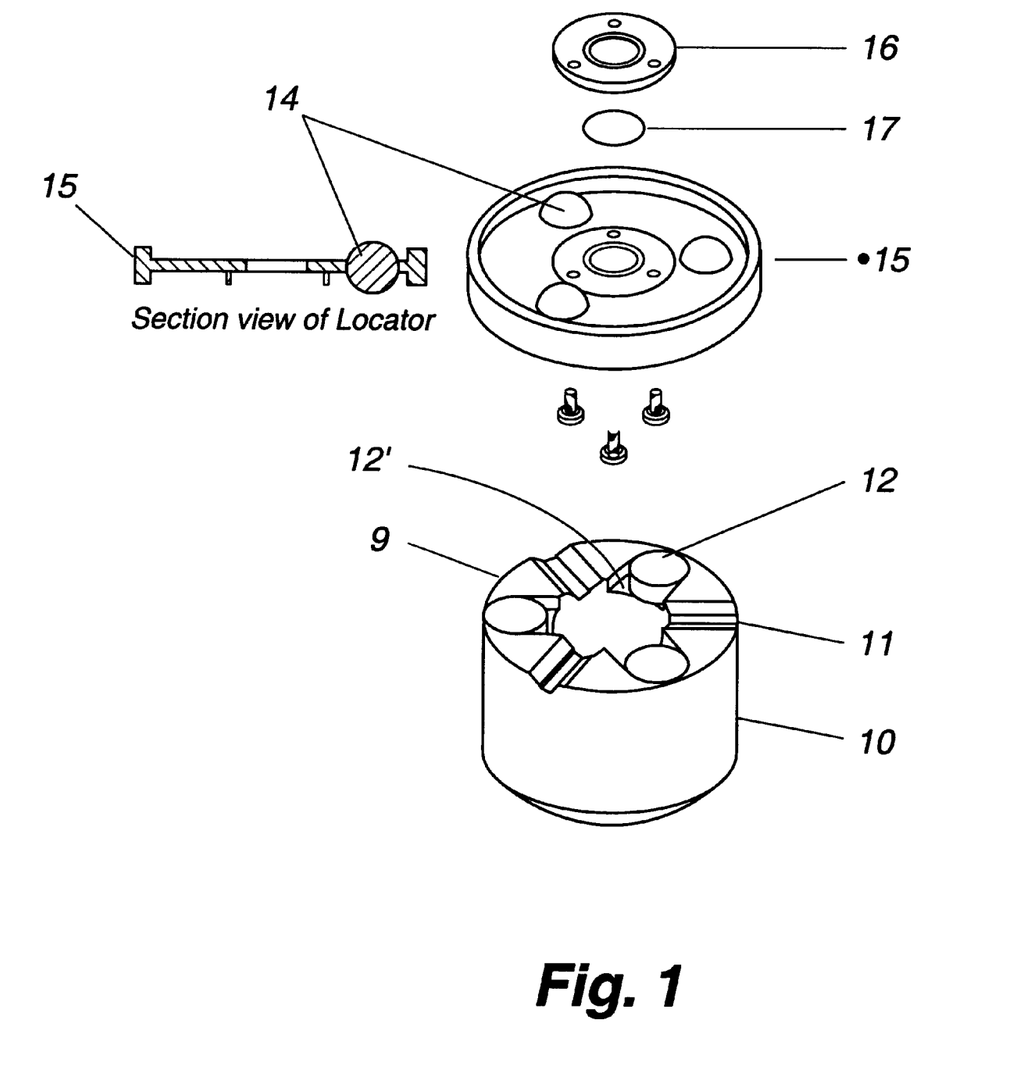
FIG. 1 is an exploded view of the present invention in its simplest embodiment.

The present invention, as seen in FIG. 1, includes three primary components: (1) locator 15; (2) kinematic mount 10; and, (3) a part support means 16. Kinematic mount 10 is a steel cylinder having a plurality of formed V-groves 11 into a top surface 9. Each of the plurality of formed V-groves 11 are equidistant from each other, but preferably, the V-groves 11 are spaced 120 or 60 degrees apart from each other. Groove shapes other than v-grooves can be utilized, as long as the projections present in the locator, as discussed below, fit within the grooves such that the locator is maintained in position upon the mount. Each mount 10 is precisely positioned relative to the spindle's center line during tooling machine setup. A rare-earth magnet 12 is embedded in pocket 12' between each V-groove 11. Other types of magnets, such as electromagnets, may also be used to create the attractive force between the locator and the mount. Electromagnets may be particularly preferred if the scale of the locator is increased to perform machining on a scale above micromachining. Specifically, it is anticipated that the locator size could be increased in diameter by the use of stronger magnetic forces. Other types of connecting means between the locator and the mount may also be used, such as gravity or vacuum forces. For the connecting means to function it is necessary that both the mount and the locator be properly constructed to be receptive to that type of connecting means. For example, to utilize vaccum forces, the mount may have the ability to produce a vacuum and the locator may have an appropriate surface to be attracted to and remain on the mount when the vacuum is created. It is desirable, however, that the connecting means allow for easy connection and disconnection and have the ability to easily connect either surface of the locator to the mount, as is achieved using magnetic forces in the preferred embodiments of the present invention.

Removable locator 15 is a washer-like steel disk having a plurality of equally spaced steel balls 14 embedded within the radius of locator 15, where steel balls 14 are crimped into position on locator 15. Projections shapes other than spheres could also be used to position locator 15 upon mount 10.

The preferred embodiment includes three equidistant-spaced steel balls 14, that is, three balls located at 120° intervals around the circumference of locator 15. Because of this design, one side of locator 15 (depicted as A in FIG. 2) is substantially similar (with only slight modifications) to the other side of locator 15 (as seen by the view depicted as B in FIG. 2) resulting in a substantially mirror image of both sides of locator 15. Further, because of this design, those of skill in the art will appreciate that locator 15 is readily removably detachable from kinetic mount 10. In the preferred embodiment, locator 15 is magnetically attached to kinematic mount 10 with either surface A or surface B. When either surface A or B of locator 15 contacts kinematic mount 10, balls 14 sit in V-groves 11, and are mechanically designed to have no greater than the desired positioning error, for example, less than 0.25 micrometer.

To set up a precision, computer numerical control (CNC) tooling machine (such as, for example, a lathe), an operator must precisely position the cutting tool relative to a part's location on the spindle. This is known as "indicating" in the art. This setup entails accurately determining the lathe's z-axis (which moves the cutting tool toward or away from the spindle) and the lathe's x-axis (which moves the tool toward or away from the spindle's center of rotation). Indicating a part and resetting tool positions for each subsequent operation becomes time-consuming tasks, especially with CNC machines.

In operation, identical mounts (such as mount 10 in FIG. 2) are secured to the tooling machines required for the machining process after they have been set up. Initially, each kinetic mount 10 is precisely positioned relative to a conventional spindle's center line. Then, a small brass rod (not shown) having a dimension of approximately 3 millimeters in diameter and 10 millimeters long is centered and secured in a locator 15, and locator 15 is attached to kinetic mount 10. Next, the z-axis zero position is determined by facing both ends of rod without moving the z-axis. This is accomplished by having one end of locator 15 faced, reversing locator 15 around 180 degrees, and then having the other end of locator 15 faced. Locator 15 is then removed from kinetic mount 10, and the length of rod is measured on a super micrometer or other precise measurement means. The operator sets the lathe's z-axis to zero by adding half of the length of rod to what the machine's z-axis position was prior to the facing locator 15 and entering this value into a computer (not shown). The x-axis zero position is then determined by machining a diameter on one end of the brass rod and measuring the diameter of the brass rod. The operator then sets the x-axis zero position by adding half of the diameter value to the lathe's x-axis position during the diameter cut and entering this value into the computer.

Once these setup measurements are made (and thus, the z-axis and the x-axis are "zeroed"), the operator is ready to machine a part. As such, a blank part 17 (e.g., the part to be precision machined) is sandwiched between locator 15 and part support means 16, in this embodiment, a retainer ring, and this retainer ring is then securely coupled to locator 15 by use of any conventional securing means, such as screws (shown generally as 18 in FIG. 2). As those skilled in the art realize, the present invention's part support 16 can be modified to suit the shape of the part 17 that must be retained within locator 15.

Figure 2:
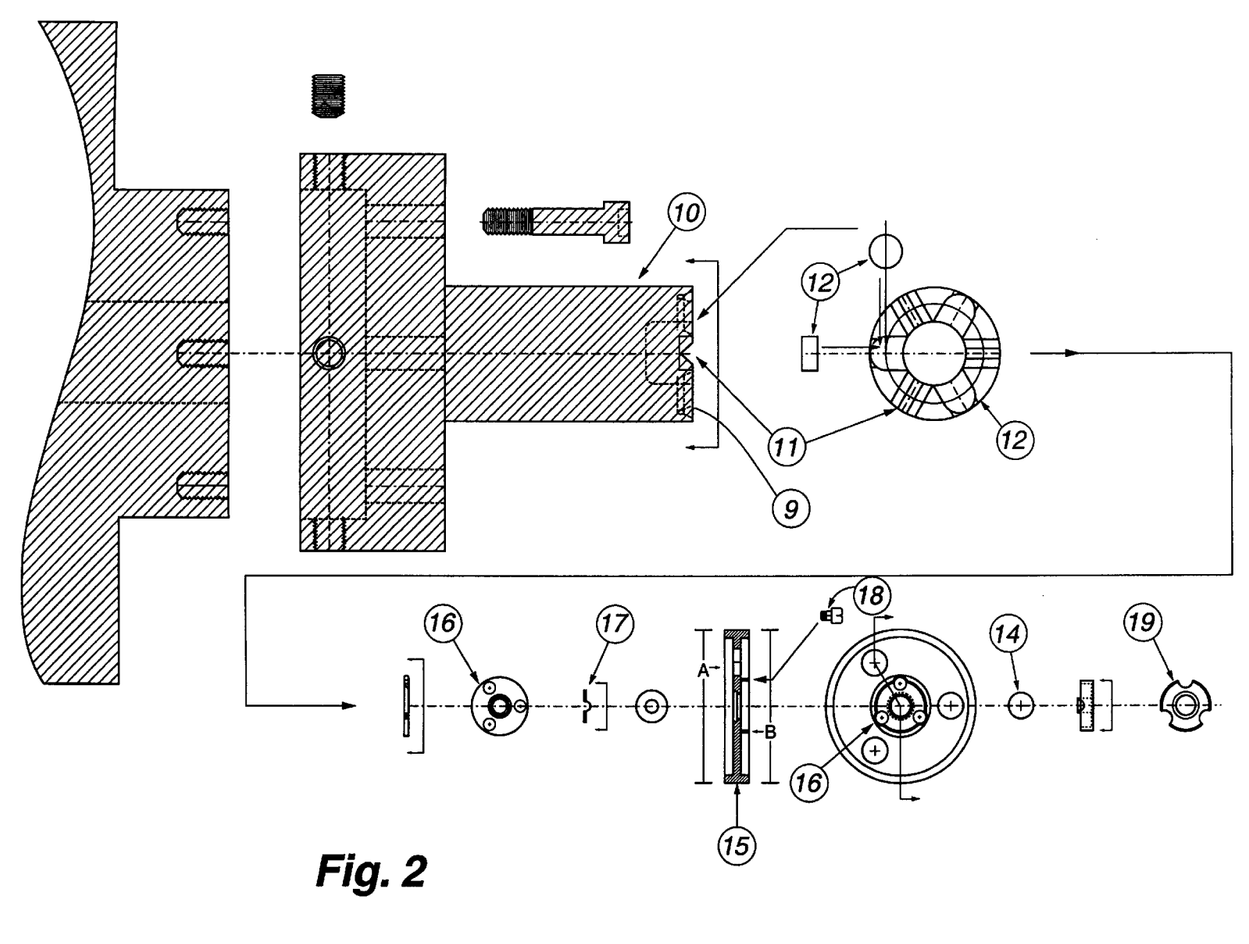
FIG. 2 is a cross sectional view of the present invention in operation.

Because both metallic surfaces of locator 15 are substantially mirror images, either surface can readily couple with kinetic mount 10, as magnetic forces from magnets 12 attract the locator surface and balls 14 fit within V-groves 11, positioning the locator 15. When locator 15 and kinetic mount 10 are securely coupled together, position accuracy of part 17 is assured since balls 14 are the only components of locator 15 which contact kinetic mount 10. Further, because of the unique method in which the locator 15 and kinetic mount 10 couple together, it will be clear to those of skill in the art that locator 15 can be readily removed from kinetic mount 10, reversed, and reinserted into secure attachment with kinetic mount 10 without any need for touching or handling part 17. Further, those of skill in the art will appreciate that removal of locator 15 from kinetic mount 10 allows locator 15 to be readily inserted into other tooling machines (if desired or necessary) which are coupled to a similarly designed kinetic mount. Those of skill in the art will also realize that depending on tooling machine product demands, several locators 15 can be used simultaneously on several different tooling machines.

Figure 3:
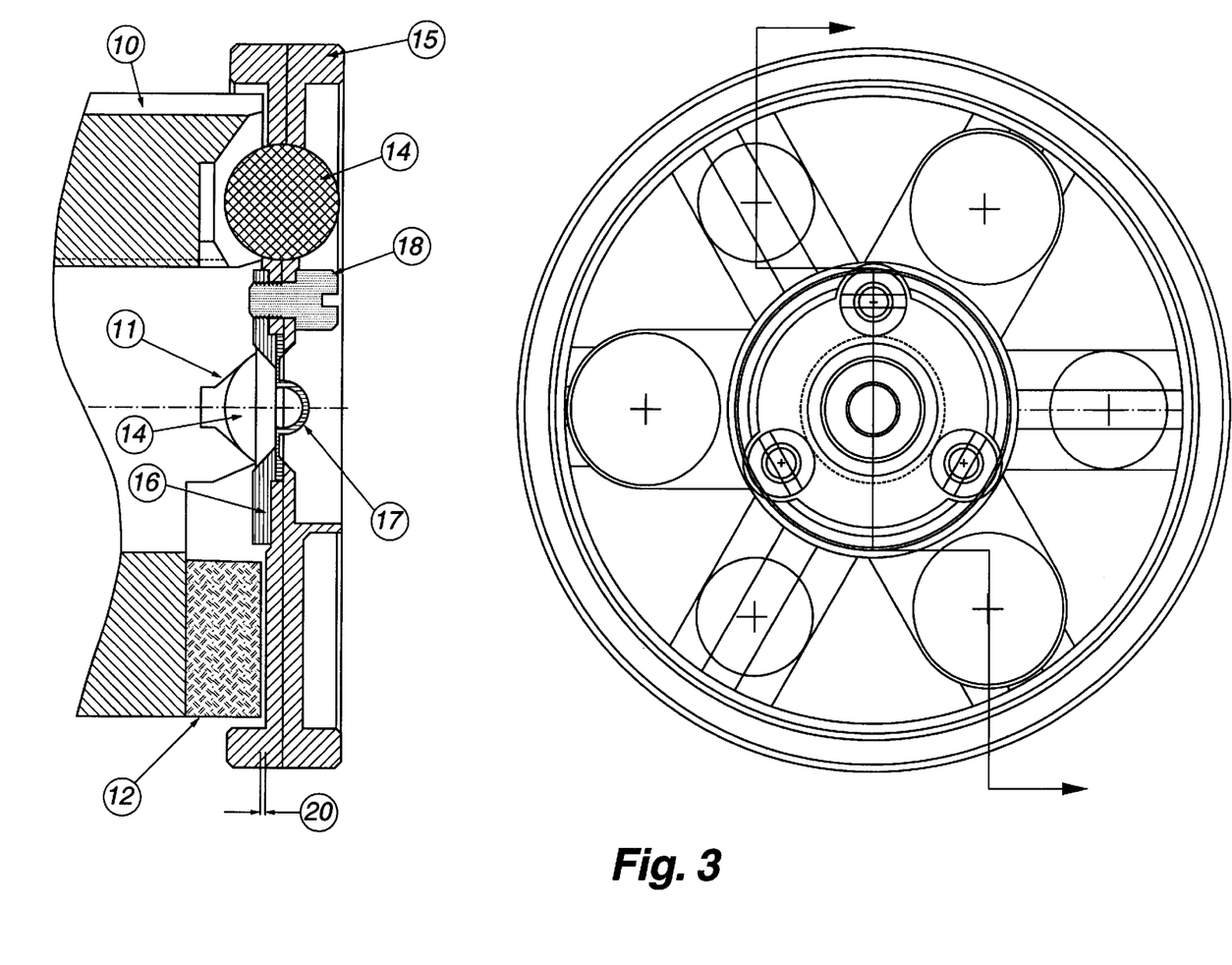
FIG. 3 is a detailed cross sectional view of FIG. 2.

For example, the present invention was developed to machine beryllium hemishells which will be joined to make laser targets for the Department of Energy's Inertial Confinement Fusion program. In our developments, the present invention is used on a Pneumo Ultra 2000 high-precision lathe. When precision machining the beryllium hemishell, the outer surface of the hemishell is first machined, and the locator is then flipped and the inner surface of the hemishell is machined. Next, the hemishell is moved to a machine that polishes both surfaces. From there, the hemishell within the present invention is taken to a interferometer that measures wall thickness. After passing quality inspections, the part is then returned to the lathe's kinematic mount, and a support means is attached to the mount with machining wax. The newly formed shell is then separated from its flange (or brim) that secures it to the locator by cutting along the shell's equator where the part is held by part support (as shown at 19 in FIG. 2). All steps, as those of skill in the art are now taught, are done without having to relocate the part or realign any of the tooling machines, while the part is machined to an accuracy of 0.25 micrometer (as seen as 20 in FIG. 3). Subsequent hemispheres are machined in the same way without time consuming indicating operations.

As such, use of the present invention results in a savings of time, reduces scrap by minimizing human errors that result in parts that fail to meet predetermined tolerance levels and specifications, and further allows only a single setup of tooling machines when a plurality of identical parts are to be fabricated. The present invention could be used in a number of different applications. For example, for parts which must be precisely repositioned for multiple machining and inspection steps, the present invention offers advantages heretofore untold in the prior art. Further, the present invention is ideal for diamond-facing operations on small lenses such as those required for fiber-optic probes or surgical tools. Both sides of the optic can be faced without fear of scratching or damaging the surfaces. Another potential use for the present invention is for making printer head parts for ink jet printers. Machining parts on one machine and micro-drillng them on another can be done without realignment problems.

In an alternative embodiment of the present invention, the present invention could be used to precisely join small matching parts, such as the two hemishells of a laser target or optiacl lenses consisting of two parts. The V-groves in the kinematic mount would be extended to become diameter cuts, dividing the surface into sixths. In this embodiment, two separate locators would have three equally spaced clearance holes machined into them, placed at 60° intervals around the circumference of the locator, and offset 60° from the steel balls of the locator. These two locators could then be stacked on a single kinematic mount with the steel balls of the upper locator offset 60° from the lower locator. Similar clearance holes are machined for the magnets and the offset bosses, as discussed in detail below. The same registration accuracy is achieved as with a single locator, since the kinematic mount's V-groves would continue through the center of the kinematic mount. When joining the hemishells, each shell would be machined separately in its locator, two locators would be piggy-backed on the kinematic mount to align the shell's equators, and the shells would be joined by laser fusing, electron beam welding, heating, or other conventional joining means. Although usable as a set, the two stackable locators can also be used individually, if one or the other part needed to undergo a particular machining process.

Figure 4:
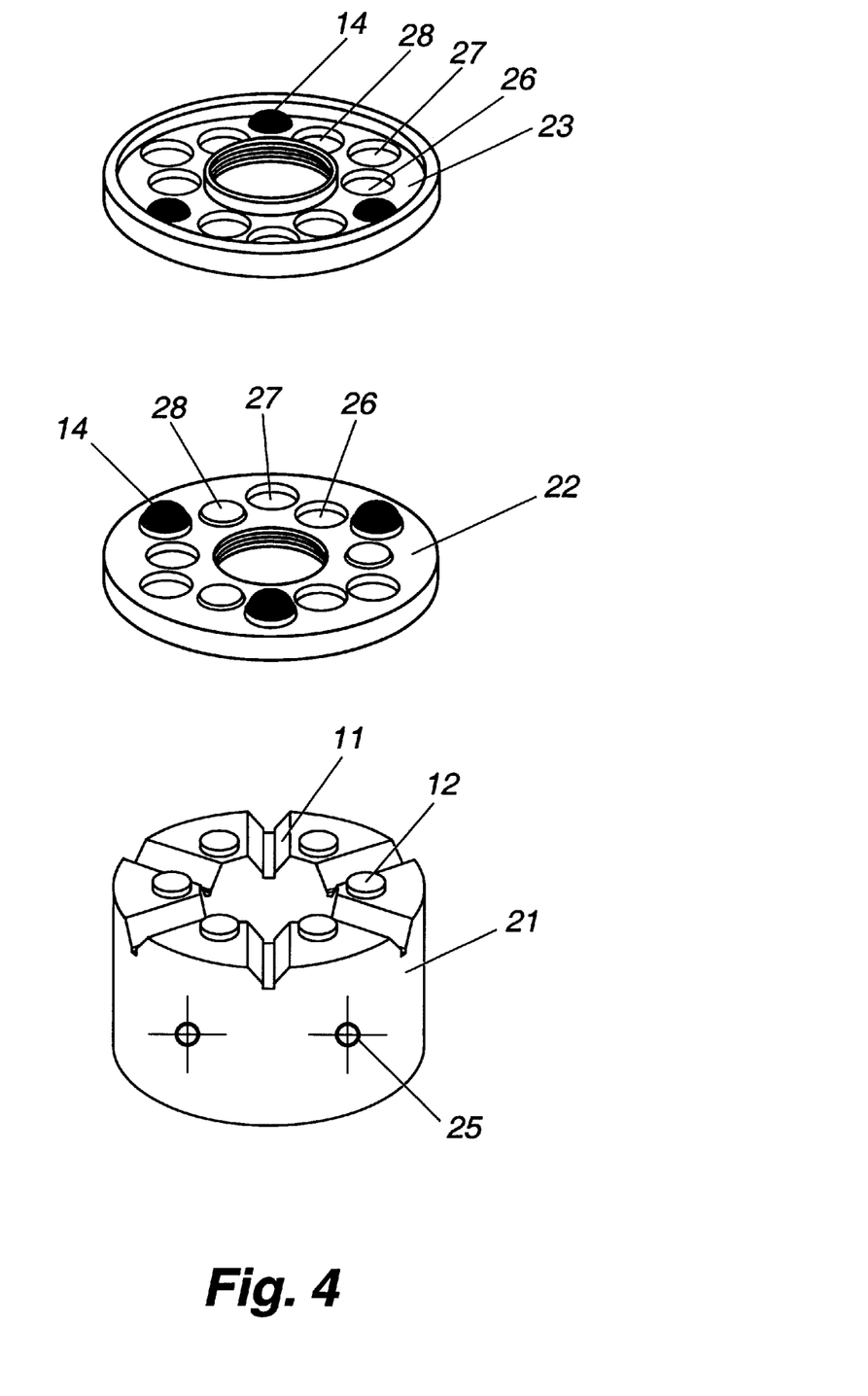
FIG. 4 is an exploded view of the multiple locator embodiment of the present invention.
Figure 5:
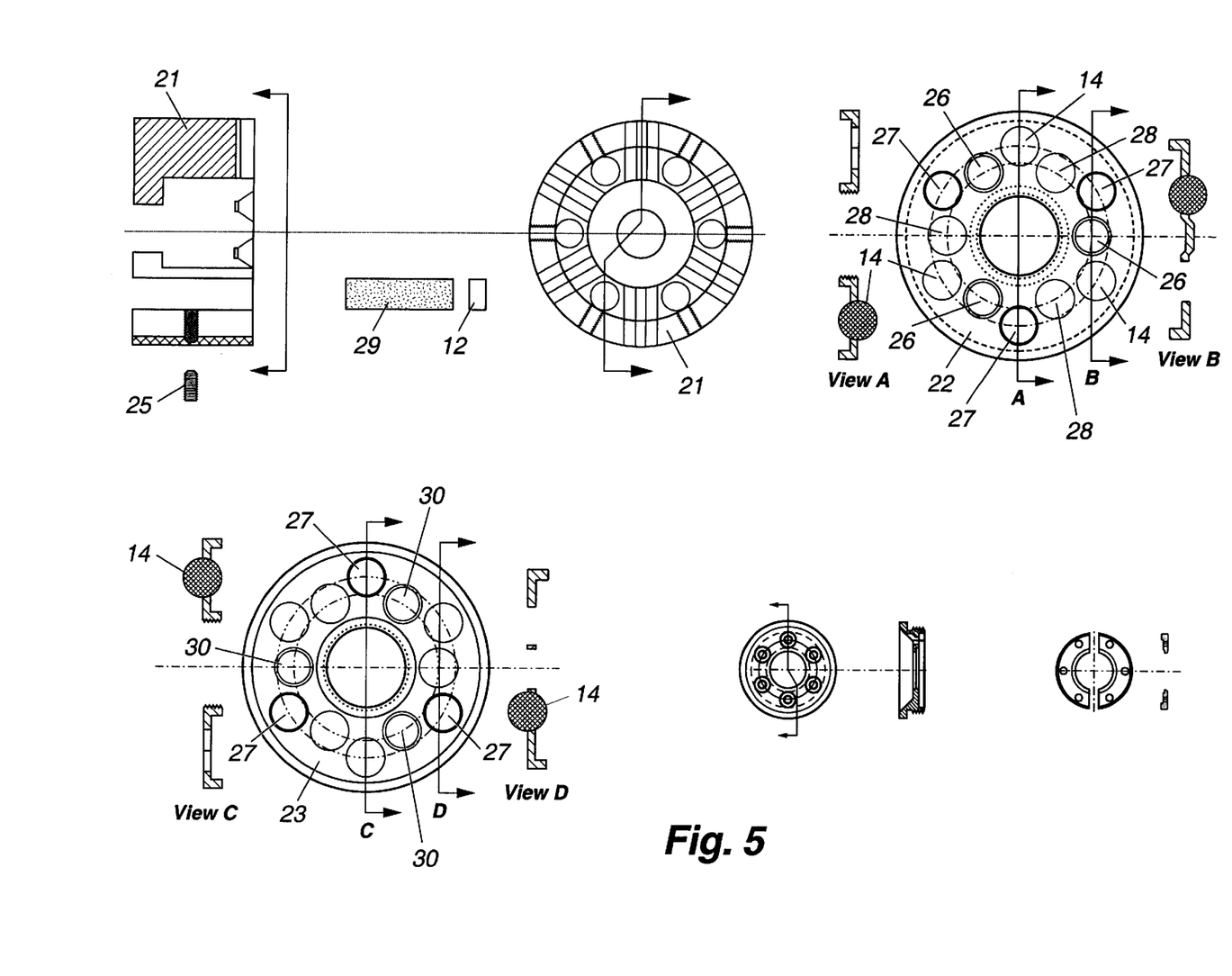
FIG. 5 includes top and cross sectional views of the components of the stacked embodiment of the present invention.

FIGS. 4, 5, 6, and 7 illustrate such an application of an alternate embodiment of the present invention. FIG. 4 shows the kinematic mount with six V-grooves 21, the stackable locator 22, which has a lip which overhangs the mount in a downward direction when set upon the mount, and stackable locator 23, which has a lip which points upward when set upon the mount (and locator 22). Locators 22 and 23 are identical in that they comprise the same components, however, the arrangement of these components is slightly different to allow the locators to stably stack. Direct surface communication between the magnets of the mount and the locators is achieved through the use of offset bosses 28 and clearance holes 26, 30. To better understand the arrangement of the stackable locators, it should be noted that, as illustrated in FIG. 4, the offset bosses of locator 22 and the offset bosses of locator 23 are offset in opposite directions. Thus, when the two locators are stacked upon the mount, the bosses of locator 22 are upwardly offset, while the bosses of locator 23 are downwardly offset. Both of these offsets are in a direction opposite of the lip overhang of the locator. This arrangement is illustrated in FIG. 7B. The arrangement has the advantage of ensuring the magnetic force between the bosses and the magnets will be equivalent for both locators. When only locator 22 is placed on the mount, every other magnet 12 attracts the indented underside of an offset boss 28 of locator 22, while the other alternate magnets 12 are open to the air because of the magnet clearance-holes 26. When locator 23 is placed upon locator 22, the magnets 12 visible through the clearance-holes 26 have direct contact with the raised surface of an offset boss of locator 23. Thus, when the locators are stacked, each of the six magnet present in the mount has direct surface communication with either an indented underside of an offset boss of locator 22 or a raised surface of an offset boss of locator 23 (by way of the magnet clearance-hole present in locator 22).

Similarly, communication between the steel balls 14 and the V-grooves 11 is achieved using clearance holes 27. To better understand the arrangement of the stackable locators, it should be noted that the steel balls 14 of locator 22 and the steel balls 14 of locator 23 are embedded to different degrees. Thus, when the locators are stacked upon the mount, the steel balls 14 of locator 22 have approximately two-thirds of the ball protruding above the surface and one-third protruding below the surface of locator 22, while the steel balls 14 of locator 23 have approximately one-third protruding above the surface and two-thirds protruding below the surface of the locator. This arrangement allows the steel balls to be on approximately the same plane when the two locators are stacked, as illustrated in FIG. 7A. When only locator 22 is placed on the mount, every other V-groove 11 has fit within it the one-third protrusion of steel ball 14 of locator 22, while the other alternate V-grooves 11 are open to the air because of the V-groove clearance-holes 27. When locator 23 is placed upon locator 22, the V-grooves 11 visible through the clearance-holes 27 are fit with the protruding two-thirds of the steel balls 14 of locator 23. The protruding two-thirds of the steel balls of locator 22 pass through the steel ball clearance-holes 27 of locator 23. Thus, when the locators are stacked, each of the six V-grooves present in the mount are fit with either a steel ball 14 of locator 22 or a steel ball of locator 23 (by way of the steel ball clearance-hole 27 present in locator 22).

Figure 6:
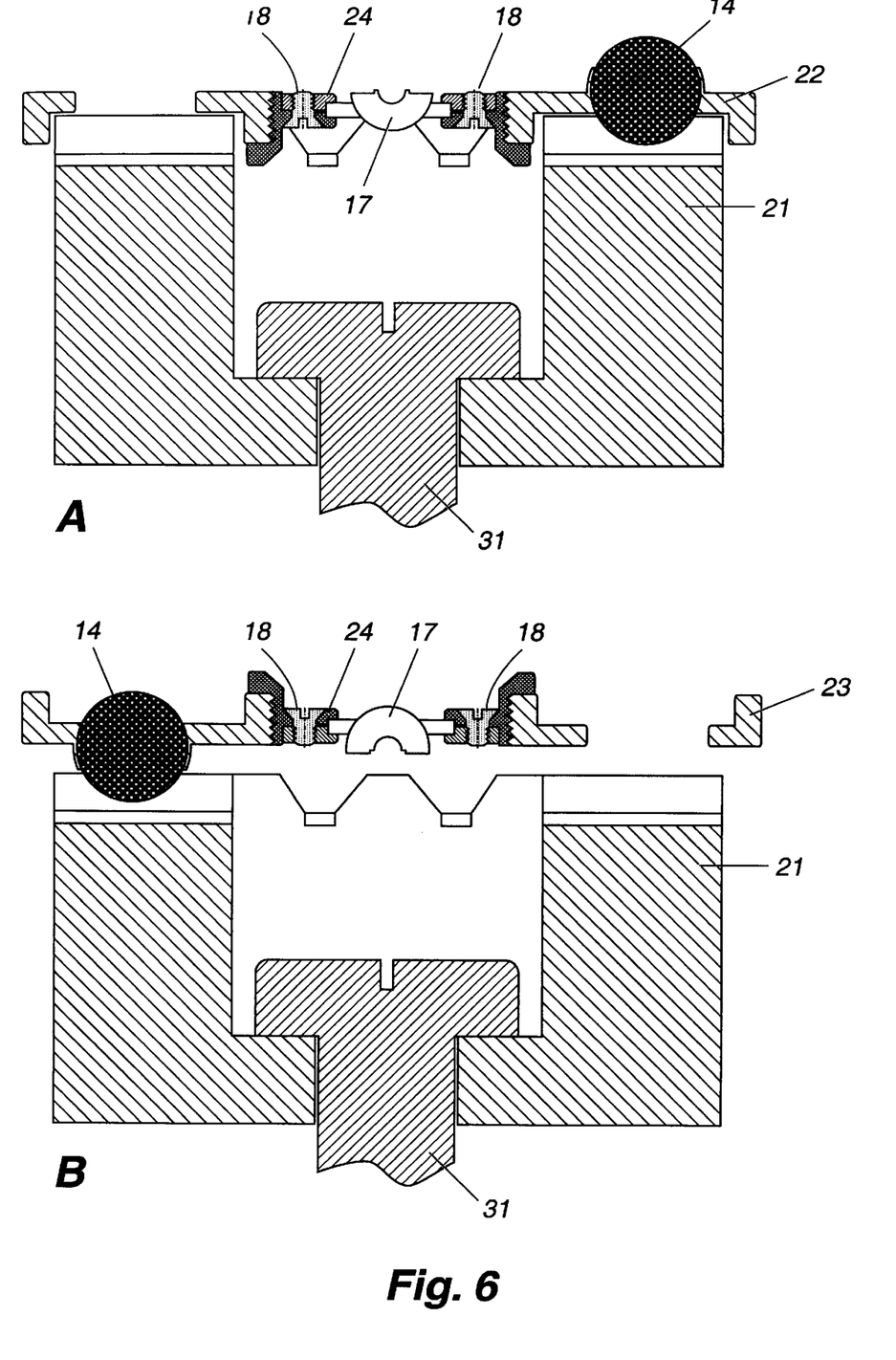
FIG. 6 includes cross-sectional views of the embodiment of the present invention which utilizes locators which can be stacked on each other, but only one locator is placed on the mount.
Figure 7:
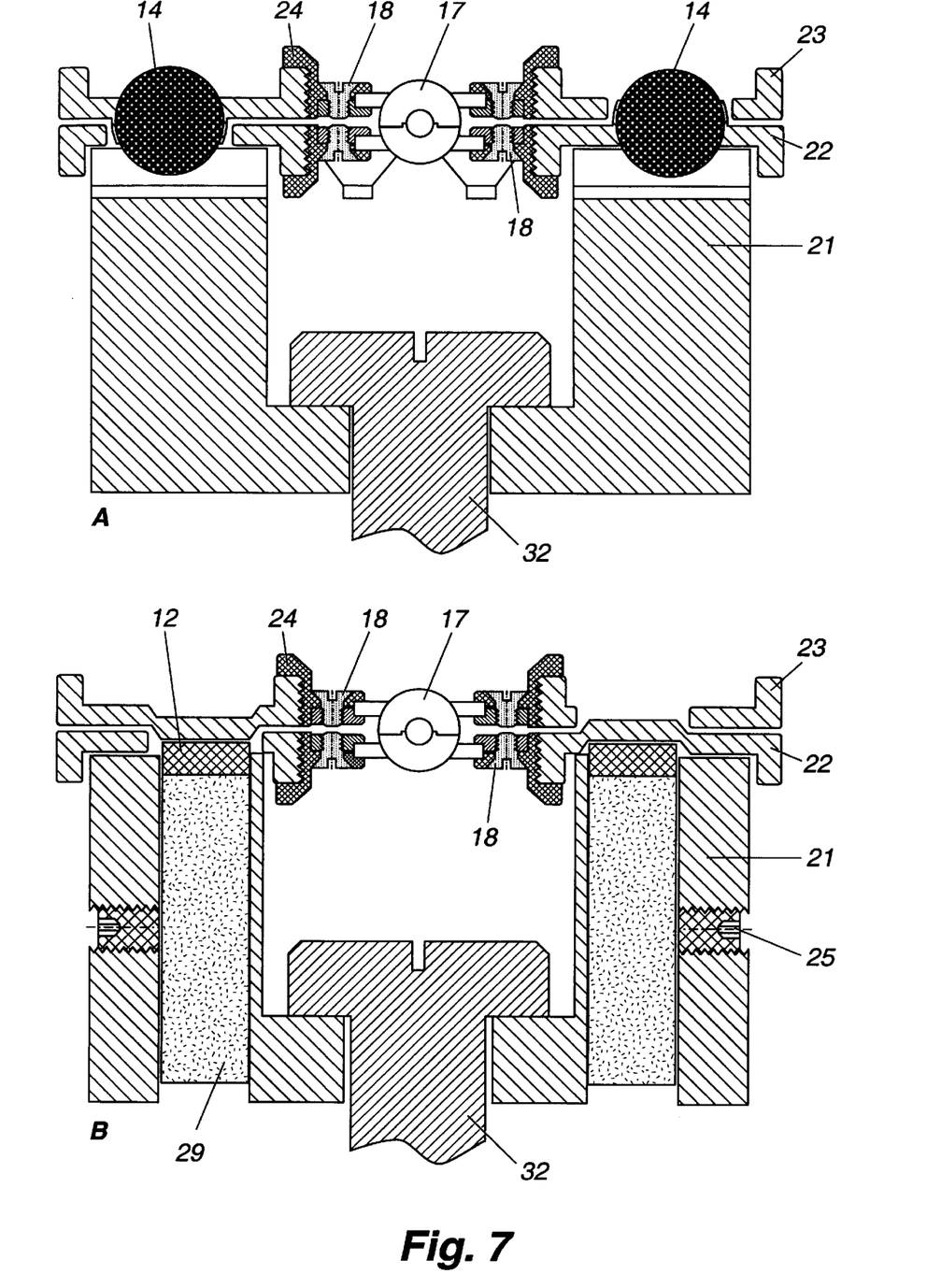
FIG. 7 includes cross-sectional view of the embodiment of the present invention which utilizes locators which can be stacked on each other, where both locators are placed on the mount.

The mount of FIGS. 4, 5, 6, and 7 also illustrate two additional features of the stackable embodiment of the present invention. First, the mount utilized has an adjustable magnet mounting system consisting of set screw 25 and adjuster for magnet position 29. This arrangement allows the magnets to be easily replaced into a desired position after the mount has been altered, for example, through the machining of a new surface. A second feature is the part support means 24 of this embodiment, which clamps the part in place during the machining or assembly process. The part support clamp means is made as follows. Starting with a blank support placed within the locator, a hole is machined in the center. A slot is then carved about the inner circumference of the hole. A hole for a connecting means is then drilled on either side of the part support. A disc shaped lower portion of the blank is separated from the upper portion, splitting the carved slot in half. This operation results in a support which can clamp on either side of the part, in the hole formed by the slot, an extended piece of the part to be machined. The piece of the part is clamped into position using the securing means 18. An individual part, held in place by the clamp part support and ready for a process to be performed on it, such as machining, is illustrated in FIG. 6. Two parts, held in place by clamp part supports and ready for a process to be performed upon them, such as assembly, are illustrated in FIG. 7. Thus, in this embodiment, the locator is used to produce the part support, as well as to perform the machining operations upon the part, once it is clamped in place using the part support.

In another embodiment of the present invention, the present invention can also be modified to machine multiple parts out of a single part blank. This capability is especially useful in mass-producing microlenses or other microassemblies for nanotechnologies. In this regard, the kinematic mount is positioned on a lathe such that its center is offset from the lathe's center (it would have to be properly counterbalanced). A locator with a large part blank could then be fastened to the kinematic mount and a single part machined at the center of the lathe, but off-center on the part blank. Rotating the locator so that the balls would seat one V-grove over from their previous position on the mount would expose a new portion of the part blank for machining a second part. A third rotation would allow a third part to be machined. Additional rotations and machining may be necessary as desired. Parts so machined could then be inspected or polished on other machines that had similarly off-center kinematic mounts. Note that in this embodiment, the machined parts are on the lathe center, while the locator and the kinematic mount are mounted eccentrically.

In another embodiment of the present invention, the present invention could be modified to machine large parts that require precise repositioning during multistep fabrication. In this regard, the present invention is useful for manufacturers of silicon wafers (requiring etching of each surface thereof) and laser optics.

Additionally, the present invention may offer the only means for micromachining some parts. For example, millimeter-sized hemishells required for laser fusion targets cannot be held in a collet, while gluing them to mandrels introduces seating uncertainties which may result in width dimension variations. Similarly, diamond-turning and polishing optical lenses on each surface is extremely difficult with conventional holders because, in repositioning a lens to work on an other surface, the operator can easily accidentally touch the polished surface, thereby contaminating and destroying such a polished surface. The present invention overcomes these fabricating difficulties.

Whereas the drawings and accompanying description have shown and described the preferred embodiment of the present invention, it should be apparent to those skilled in the art that various changes may be made in the form of the invention without affecting the scope thereof.

What is claimed is:

1. A locator and mount apparatus for machining parts, said apparatus comprising
    (1) a kinematic mount which comprises on its top surface either a connecting means or means receptive to a connecting means and grooves, said connecting or said receptive means and said grooves alternating circumferentially; and
    (2) at least one locator comprising either a connecting means or a means receptive to a connecting means which further comprises a part support means and, on both locator surfaces, a plurality of projections, where said projections are positioned and sized such that when said locator is disposed on said mount, with either surface contacting said mount, said projections and said grooves position said locator upon said mount.

2. The apparatus of claim 1 wherein said mount comprises a connecting means and said connecting means are magnets, and said locator comprises a means receptive to said connecting means and said receptive means is that said locator is made of a material attractive to said magnets.

3. The apparatus of claim 2 wherein said magnets are rare earth magnets.

4. The apparatus of claim 1 wherein said grooves are V-grooves.

5. The apparatus of claim 4 wherein said mount comprises three V-grooves, radially placed at 120° intervals around the circumference of said mount.

6. The apparatus of claim 4 wherein said mount comprises six V-grooves, radially placed at 60° intervals around the circumference of said mount.

7. The apparatus of claim 2 wherein said mount comprises an adjustable magnet mounting system.

8. The apparatus of claim 1 wherein said projections are steel balls.

9. The apparatus of claim 8 wherein said locator comprises three steel balls placed at 120° intervals around the circumference of said locator.

10. The apparatus of claim 1 wherein said locator comprises a part support means which comprises a retainer ring.

11. The apparatus of claim 1 wherein said locator comprises a part support means which comprises a part support clamp means.

12. The apparatus of claim 1 wherein said at least one locator comprises a first locator and a second locator wherein said locators are simultaneously disposed upon said mount.

13. The apparatus of claim 12 wherein said first locator comprises a means to carry a part, a plurality of projections, a plurality of offset bosses, magnet clearance holes, and projection clearance holes, where such components are positioned such that two locators can be simultaneously disposed upon said mount.

14. The apparatus of claim 13 wherein said first locator comprises three projections, three offset bosses, three magnet clearance holes and three projection clearance holes and each of these components is placed at 120° intervals around the circumference of said locator.

15. The apparatus of claim 12 wherein said second locator comprises a means to carry a part, a plurality of projections, a plurality of offset bosses, offset boss clearance holes, and projection clearance holes, where such components are positioned such that two locators can be simultaneously disposed upon said mount.

16. The apparatus of claim 15 wherein said second locator comprises three projections, three offset bosses, three offset boss clearance holes, and three projection clearance holes and each of these components is placed at 120° intervals around the circumference of said locator.

* * * * *